(12) United States Patent
Lu et al.

(10) Patent No.: US 8,522,024 B2
(45) Date of Patent: Aug. 27, 2013

(54) AUTHENTICATION METHOD, SYSTEM, AND DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 102 days.

(21) Appl. No.: 13/125,130

(22) PCT Filed: Dec. 24, 2010

(86) PCT No.: PCT/CN2010/080274
§ 371 (c)(1),
(2), (4) Date: Jul. 7, 2011

(87) PCT Pub. No.: WO2011/079753
PCT Pub. Date: Jul. 7, 2011

(65) Prior Publication Data
US 2012/0137131 A1    May 31, 2012

(30) Foreign Application Priority Data

Dec. 31, 2009  (CN) .......................... 2009 1 0244639
Jan. 13, 2010  (CN) .......................... 2010 1 0034165

(51) Int. Cl.
*H04L 29/06* (2006.01)
(52) U.S. Cl.
USPC .............................................. 713/168; 726/6

(58) Field of Classification Search
USPC .............................................. 713/168; 726/6
See application file for complete search history.

(56) References Cited

U.S. PATENT DOCUMENTS

2008/0168543 A1 * 7/2008 von Krogh ........................ 726/6

* cited by examiner

*Primary Examiner* — Jeffrey Pwu
*Assistant Examiner* — Michael D Anderson
(74) *Attorney, Agent, or Firm* — Hammer & Associates, P.C.

(57) ABSTRACT

The present invention provides an authentication method, an authentication system, and an authentication device, which is in information security field. The method includes that a service side receives a username and a first value from a client side, searches a seed of a dynamic password token, and generates a first dynamic password according to the first value and the seed, converts the first dynamic password to the first authentication password and the second authentication password, and sends the first authentication password to the user; the dynamic password token generates a second dynamic password and sends the first authentication password to a user; the dynamic password token generates a second dynamic password and converts the second dynamic password to a third authentication password and a fourth authentication password; the user compares the first authentication password and the third authentication password to determine that they are identical, so as to confirm that the user is legal or the transaction is permissible. The invention prevents malicious attack and operation of illegal users, which improves the security of information and property of the users.

18 Claims, 7 Drawing Sheets

AUTHENTICATION METHOD, SYSTEM, AND DEVICE

FIELD OF THE INVENTION

The invention relates to information security technology field, specifically, to an authentication method, an authentication system (secure transaction system), and an authentication device thereof.

BACKGROUND OF THE INVENTION

The network technology is widely used in human daily life, and people relies much on the network for more daily activities such as shopping, office working, and entertaining online. For the enhanced using of network application, websites which provide all kinds of convenient services come up, and the number of the websites is increasing as well. Meanwhile, the websites require higher security, in particular, the website relates to online bank or government office work which requires absolute safety of legal users when they are logging on the Internet. With the development of hacker, traditional authentication way by using the username plus the statistic code cannot meet the need of present security.

In recent years, a dynamic password authentication method is raised up in the authentication field. Dynamic password is added on the basis of the static password authentication, which provides additional protection for a user password and enhances the security. In prior art, the authentication for the dynamic password authentication is performed in the following way:

The service provider distributes a dynamic password token to a user. With the same size as a USB drive, the token is an electric device with processor and can run itself independently when the token is loaded with cells or is powered. Generally, a seed, which is called as static factor, corresponding to the dynamic password token, is stored inside the dynamic password token. The seed is a long character string or data;

The dynamic password token can generate a dynamic password according to the dynamic algorithm built in the token by using the seed and a dynamic factor;

The user uses the dynamic password generated by the dynamic password token to log in at service side. Because the dynamic factor associates with time or event factor usually, the dynamic passwords generated are different from time to time, which provides higher security.

Phishing website is a fraudulent website, which imitates the interface of a real website and has subtle difference with the real website in URL. A general user may confuse the phishing website with the real website, that is, the phishing website masquerades as a real website. If a user logs on a phishing website, the phishing website will record the logon information input by the user. The illegal user posed as a legal user will log on the real website with this information, which will bring a big loss to the legal user.

Though the dynamic password in the prior art has high security and is difficult to be decoded, the dynamic password cannot prevent from being attacked by some malicious website (for example, phishing website).

At present, no effective solution is raised for solving the low security of the dynamic password authentication in the prior art.

SUMMARY OF THE INVENTION

The object of the present invention is to provide an authentication method, an authentication system, and an authentication device, which can improve the security of information and property of the users, so as to prevent malicious attack and operation of illegal users.

According to the one aspect of the present invention, there is provided an authentication method, wherein the method comprises receiving, by a service side, transaction data and a first value entered by a user from a client side, in which the first value is got according to a dynamic factor by a dynamic password token and the transaction data comprises a username;

searching, by the service side, for a seed of the dynamic password token corresponding to the transaction data, correcting the dynamic factor of the service side according to the first value, generating a first dynamic password according to the corrected dynamic factor and the seed, and converting the first dynamic password to a first authentication password and a second authentication password according to a preset rule;

returning, by the service side, authentication information to the client side and the authentication information comprising a first authentication password;

generating, by the dynamic password token, a second dynamic password according to the dynamic factor and the seed pre-stored in the dynamic password token and converting the second dynamic password to a third authentication password and a fourth authentication password according to the preset rule;

confirming, by the client side, that the service side is legitimate after determining, by the user, that the first authentication password and the third authentication password are identical; and authenticating the client side or executing transaction, by the service side, according to the fourth authentication password and the second authentication password.

According to the another aspect of the present invention, there is provided a secure transaction system, wherein the secure transaction system comprises a client side, a dynamic password token, and a service side, the dynamic password token comprises a first generating module for generating a first value according to the dynamic factor of the dynamic password token, further for generating a second dynamic password according to the dynamic factor and a pre-stored seed;

a first converting module for converting the second dynamic password generated by the first generating module to a third authentication password and a fourth authentication password; and a first outputting module for outputting the first value generated by the first generating module, further for outputting the third authentication password and the fourth authentication password converted by the first converting module, the client side comprises a first receiving module for receiving transaction data and the first value entered by the user and receiving the confirming information confirmed by the user that a first authentication password and the third authentication password converted by the first generating module of the dynamic password token are identical, the transaction data comprising a username;

the first receiving module being further for receiving authentication information sent by the service side, the authentication information comprising the first authentication password; the first receiving module being further for receiving a determining signal sent by the user and indicating that whether the third authentication password and the first authentication password are identical;

a first sending module for sending the transaction data and the first value entered by the user and received by the first receiving module to the service side;

a second outputting module for outputting the first authentication password sent by the service side and received by the first receiving module, and the service side comprises a second receiving module for receiving the first value and the transaction data sent by the sending module of the client side;

a second generating module for generating the first dynamic password according to the first value received by the second receiving module of the service side;

a second converting module for converting the first dynamic password generated by the second generating module of the service side to the first authentication password and a second authentication password;

a second sending module for sending the authentication information to the client side; and an authenticating and transacting module for authenticating the client side or executing transaction by using the fourth authentication password and the second authentication password.

According to the present invention, the generated dynamic password is converted to two authentication passwords, so as to provide a safer authentication. Therefore, the present invention can effectively prevent malicious attack and operation of illegal users, which improves the security of information and property of the users.

DETAILED DESCRIPTION OF THE INVENTION

Objects, technical solutions, and advantages of the invention will be easily understood by reference to the following description of embodiments when read in conjunction with the accompanying drawings.

Embodiment 1

Figure 1:
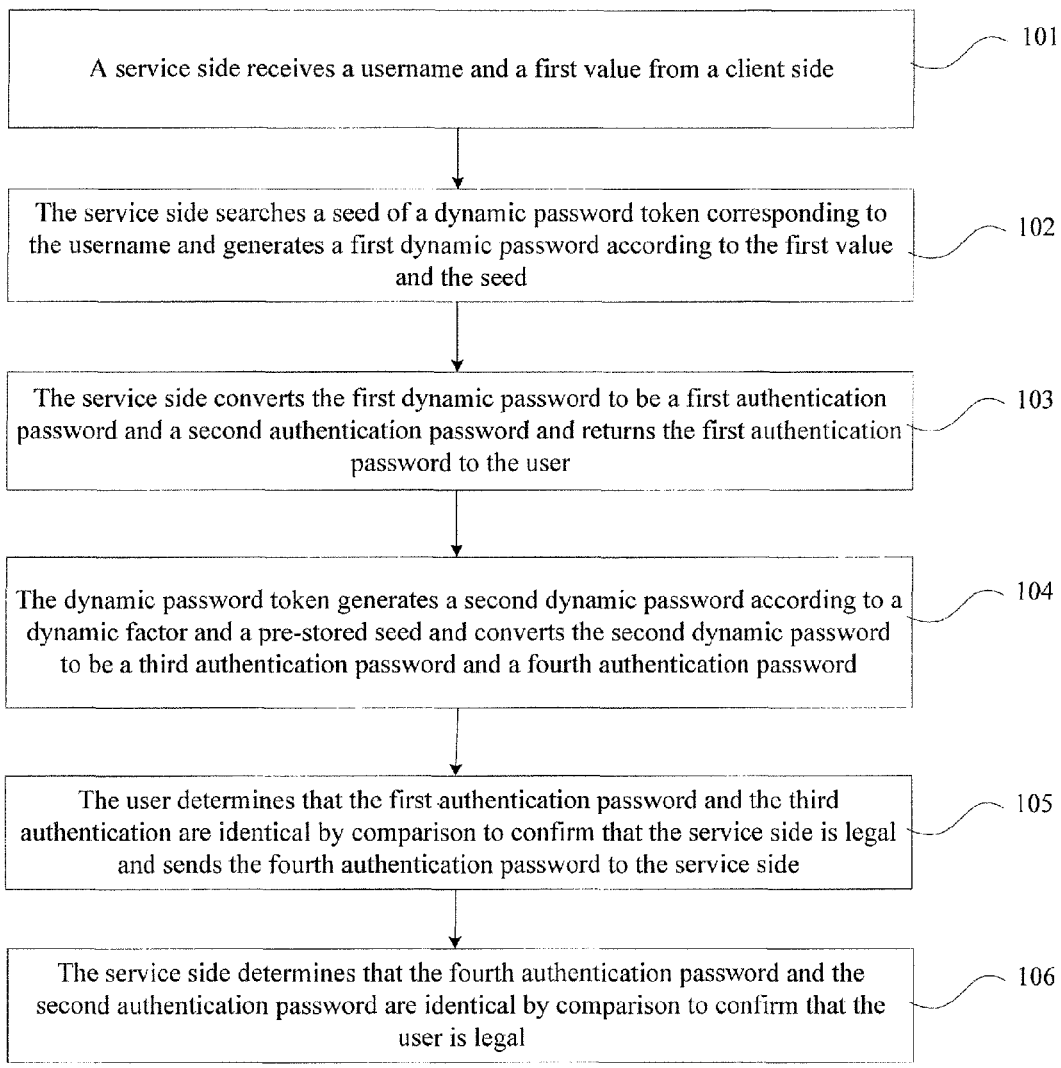
FIG. 1 is a flow chart illustrating an authentication method provided by Embodiment 1.

The embodiment provides an authentication method, which uses a dynamic password token. The dynamic password token is corresponding to the username of a user. The number of the dynamic password token, a seed for generating a dynamic password and an algorithm, which are associated with the username, are pre-stored at the service side. Referring to FIG. 1, the method includes the following steps:

Step 101, a service side receives a username and a first value from a client side;

Thereby, the username can be identification card number of the user, an email of the user or a bank account number of the user. Any information can identify the user can be used as the username of the user.

Generated by the dynamic password token, the first value can be a random number or a value generated according to the information associated with the dynamic password token, for example, a number gotten by times of generating dynamic passwords. Thereby a dynamic factor includes a random number or times of generating dynamic passwords by the dynamic password token.

Step 102, the service side searches for a seed of the dynamic password token corresponding to the username above, corrects the dynamic factor of the service side according to the first value above, and generates a first dynamic password according to the corrected dynamic factor and the seed.

An algorithm for generating a first dynamic password is stored at the service side, and is stored in the dynamic password token as well, which assures that the dynamic passwords generated by the legal service side and the dynamic password token are identical. So that the authentication function is realized.

When the first value is a random number, the service side generates the first dynamic password according to the random number and the founded seed;

When the first value is the value generated according to the information associated with the dynamic password token. The service side corrects the times of generating dynamic passwords stored by itself, and generates a first dynamic password by using the corrected times of generating dynamic passwords and the seed.

Step 103, the service side converts the first dynamic password to a first authentication password and a second authentication password according a predetermined rule, and returns the first authentication password to the user;

Thereby, the predetermined rule is a conversion algorithm pre-stored at the service side and the dynamic password token. For example, the conversion algorithm is taking bytes with predetermined length and converting the bytes to letters and setting the letters to be the first authentication password, and setting the rest part of the first dynamic password to be the second authentication password;

Step 104, the dynamic password token generates a second dynamic password according to the dynamic factor and the pre-stored seed, and converts the second dynamic password to a third authentication dynamic password and a fourth authentication password according to the predetermined rule above;

The step 104 can be performed between step 101 and step 102 or between step 102 and step 103, which is not limited by executing procedure of the present embodiment.

Step 105, the user compares the first dynamic password and the third dynamic password, and gets the result that the first dynamic password and the third dynamic password are identical; the service side is confirmed to be legal, the client side sends the fourth authentication password to the service side;

The user can get the third authentication password and fourth authentication password according to what is displayed on the dynamic password token or sound generated by the audio part of the dynamic password token, and can get the first authentication password according to what is displayed at the service side or the sound generated by the audio part of the client side;

Step 106, the service side compares the fourth authentication password and the second authentication password and gets the result that the fourth authentication password and the second authentication password are identical; the service side confirms that the user is legal.

The service side confirms that the user is legal and permits the user to log on and perform the corresponding operation.

The first value and the second dynamic password generated by the dynamic password token are triggered by the user. That is, the first value and the second dynamic password are generated after inputting an instruction by the user, for example, pressing a specified key on the dynamic password token.

In the embodiment 1, a generated dynamic password is converted to two authentication passwords by which the authentication is performed. It is assured that both of the service and the user are legal, which prevents the attack from malicious website, such as phishing website, and enhances the security of the system and guarantees the security of the user information.

Embodiment 2

Figure 2:
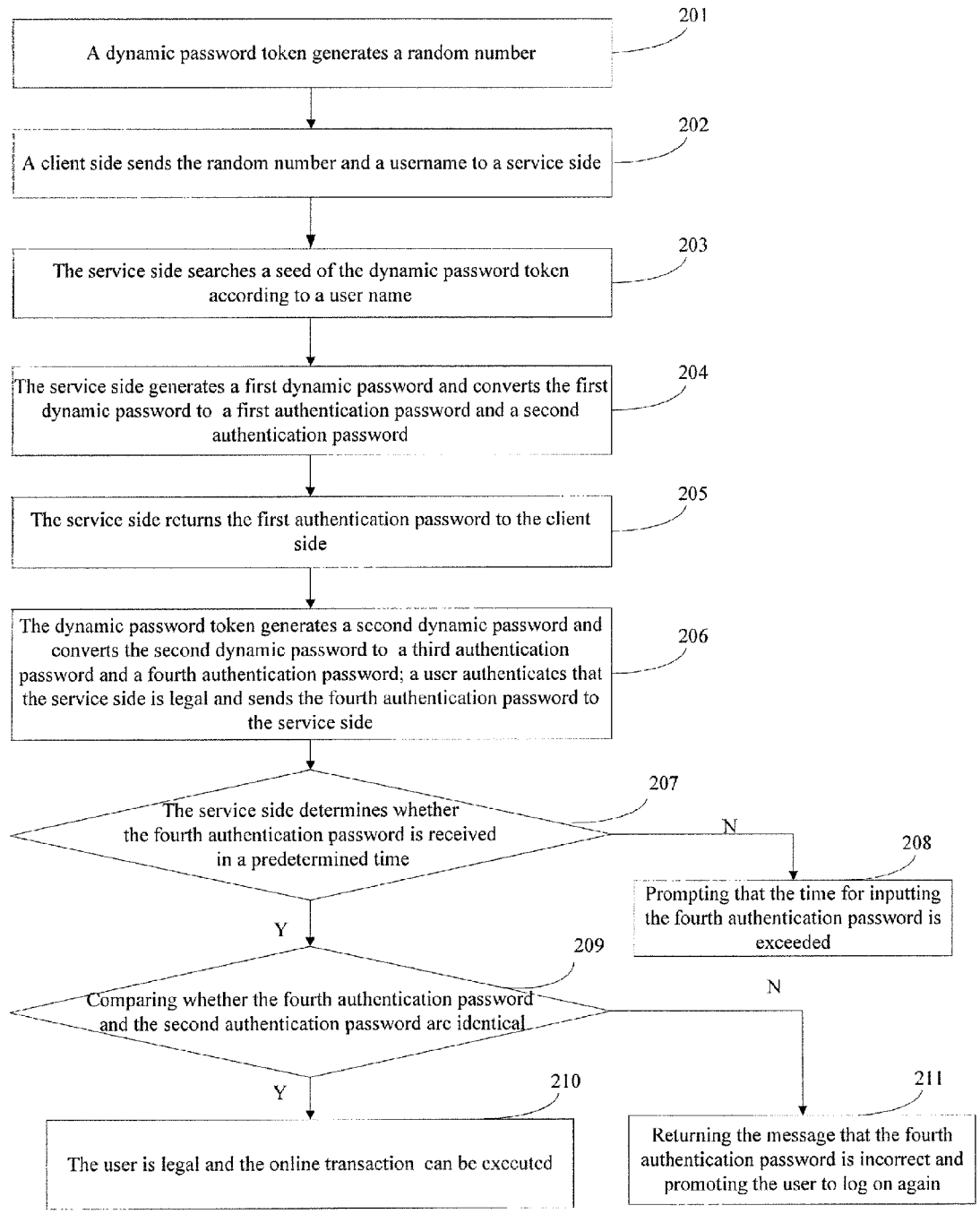
FIG. 2 is a flow chart illustrating an authentication method provided by Embodiment 2.

The embodiment 2 provides an authentication method. Illustrated by an example that a user logs on bank online by a dynamic password, the embodiment 2 presents the process of authentication performed by the server side when the user logs on bank online. Thereby, the dynamic password used in the embodiment 2 is bonded with the account number of the user in the embodiment 2. Referring to FIG. 2, the authentication method includes the following steps:

Step 201, a dynamic password token generates a random number;

In the embodiment 2, the dynamic password has a press key. When the user presses the press key for the first time, the dynamic password token generates a random number according to an algorithm stored in the dynamic password token. Thereby, the random number can be a number with, but not limit to, 2 to 8 digits;

Step 202, a client side sends the random number and the username to the service side;

In the embodiment 2, the user inputs the random number and the username by the input device of the client side and the client side sends the random number and the username to the service side. The username includes at least one of the following items: account number, identification number, and email;

Step 203, the service side searches for the seed of the dynamic password token held by the user according to the username;

In the embodiment 2, the dynamic password token has a unique code and the seed is stored in the dynamic password token. The seed is a static factor needed by the dynamic password token to generate a dynamic password by using a dynamic password algorithm. The seeds stored in the dynamic password tokens are different from each other. The user bonds the username, for example, the account number, and the dynamic password token together. The service side will store the number of the dynamic password token corresponding to the username and the seed and store the dynamic password algorithm which is same as the algorithm stored in the dynamic password token to generate a dynamic password;

That the service side searches the seed of the dynamic password token held by the user includes that the server side searches the number of the dynamic password token bonded with the username of the user according to the username and searches the seed of the dynamic password token according to the number of the dynamic password token;

The service side searches the seed of the dynamic password token held by the user can include that when the user bonds the dynamic password token with the username, the service side builds up corresponding relationship between the username and the seed of the dynamic password token; the service side can find the corresponding seed of the dynamic password token according to the username;

Step 204, the service side generates the first dynamic password according to the random number and the seed and converts the first dynamic password to a first authentication password and a second authentication password according to a predetermined rule;

In the embodiment 2, for example, the generated first dynamic password is a number with 8 digits. The algorithm for generating the first dynamic password by the service side can be HMAC, MD5, SHA-1, or SHA-2;

Preferably, the predetermined rule above could be taking a part of the first dynamic password and converts the part to letters and sets the letters to be the first authentication password and sets the rest part of the first dynamic password to be the second authentication password;

The predetermined rule above could be taking a part of the first dynamic password as the first authentication password, and the rest part of the first dynamic password as the second dynamic password;

For example, the generated first dynamic password is 65882632. Taking the first three digits 6, 5, and 8 from the first dynamic password; assembling the first digit and the second digit, assembling the first digit and the third digit, and assembling the second digit and the third digit to get three numbers 65, 68 and 58. Dividing the three numbers by 26 to get three remainders 13, 16, and 6, respectively. Setting the 26 letters A-Z to correspond to the numbers 1-26 (case-insensitive). According to the corresponding relationship, the three letters corresponding to the three remainders are M, P, and F. The first authentication password is MPF. The rest part of the first dynamic password, that is, 82632 is set to be the second authentication password;

If the display of the dynamic password token is a segmented display, the first authentication password can be converted to seven-segment code. If the segmented display can indicate seven letters A, b, C, d, E, F, and P (case-insensitive), the seven letters correspond to seven numbers 1-7. Taking the first three digits 6, 5 and 8; assembling the first digit and the second digit; assembling the first digit and the third digit, and assembling the second digit and the third digit to get three numbers 65, 68, and 58; dividing the three numbers by 7 respectively to get three remainders 2, 5 and 2. According to the letters corresponding to the three numbers, the first authentication password is bEb; taking the rest part of the first dynamic password 82632 as the second authentication password;

In the method of the getting the first and the second authentication passwords presented above, the second authentication password can be converted to letters as well. In addition, the first and the second authentication passwords, which are not limited to numbers and letters, could be characters besides the numbers and the characters, for example, "." or "-", etc.

Step 205, the service side sends the first authentication password to the client side; the client side outputs the first authentication password;

In the embodiment 2, the client side outputs the first authentication password by display or audio broadcast;

Step 206, the dynamic password token generates a second dynamic password and converts the second dynamic password to a third authentication password and a fourth authentication password according to a predetermined rule, and outputs the third and the fourth authentication passwords; the user sends the fourth authentication password to the service side after authenticating that the service side is legal according to the third authentication password;

In the embodiment 2, the dynamic password token generates a second dynamic password when the token is triggered by the user, and the second dynamic password is generated by using the random number generated in step 201 according to the dynamic password algorithm and the seed stored in the token. Thereby, the dynamic password algorithm for generating the second dynamic password is same as the algorithm for generating the first dynamic password generated in step 204 by the service side.

The process of converting the second dynamic password to the third authentication password and the fourth authentication password according to the predetermined rule is same as what is described in step 204. No more details are given hereafter.

The dynamic password token outputs the third authentication password and the fourth authentication passwords simultaneously via the display at the same time. For example, if the display of the dynamic password token is the segmented display, the authentication passwords are output in the form of bEb82632;

The user compares the third authentication password with the first authentication password; if they are identical, the service side is legal; the fourth authentication password is input at the client side and is sent to the service side; if they are not identical, the service side is not legal and the process of log on is stopped.

Step 207, the service side determines whether the fourth authentication password is received in a predetermined time, if so, goes to step 209; otherwise, goes to step 208;

In the embodiment 2, the predetermined time is the valid time for the service side to receive the fourth authentication password. For example, time counting is started when the service side finishes the sending of the first authentication password; if no fourth authentication password is received in 10 minutes since then, the service side will regard that the time for inputting the fourth authentication password is expired;

Step 208, returning error message to the client side and prompting the user that the time for inputting the fourth authentication password is expired;

Step 209, the service side compares the fourth authentication password and the second authentication password to determine whether they are identical, if yes, goes to step 210; otherwise, goes to step 211;

Step 210, the user is legal and can perform transaction online; Step 211, returning the prompt that the fourth authentication password is incorrect to the user side, and prompting the user to log on again.

If the user is to log on again, the user needs to repeat the steps above. If the times for failure authentication of the fourth authentication password at the service side reach a maximum times (a preset value), or the time for the user to logon exceeds the preset maximum time, the user is forbidden to log on.

The embodiment 2 can include that the user inputs a static password to the service side via the client side; the service side authenticates the static password at the time of authenticating the fourth authentication password. If both the static password and the fourth authentication password are legal, the user is legal, otherwise, the user is not legal and the logon is failed.

In the embodiment 2, a generated dynamic password is converted to two authentication passwords by which the authentication is performed. It is assured that both of the service and the user are legal, which prevents the attack from malicious website, such as phishing website, enhances the security of the system, and guarantees security of the user information.

Embodiment 3

Figure 3:
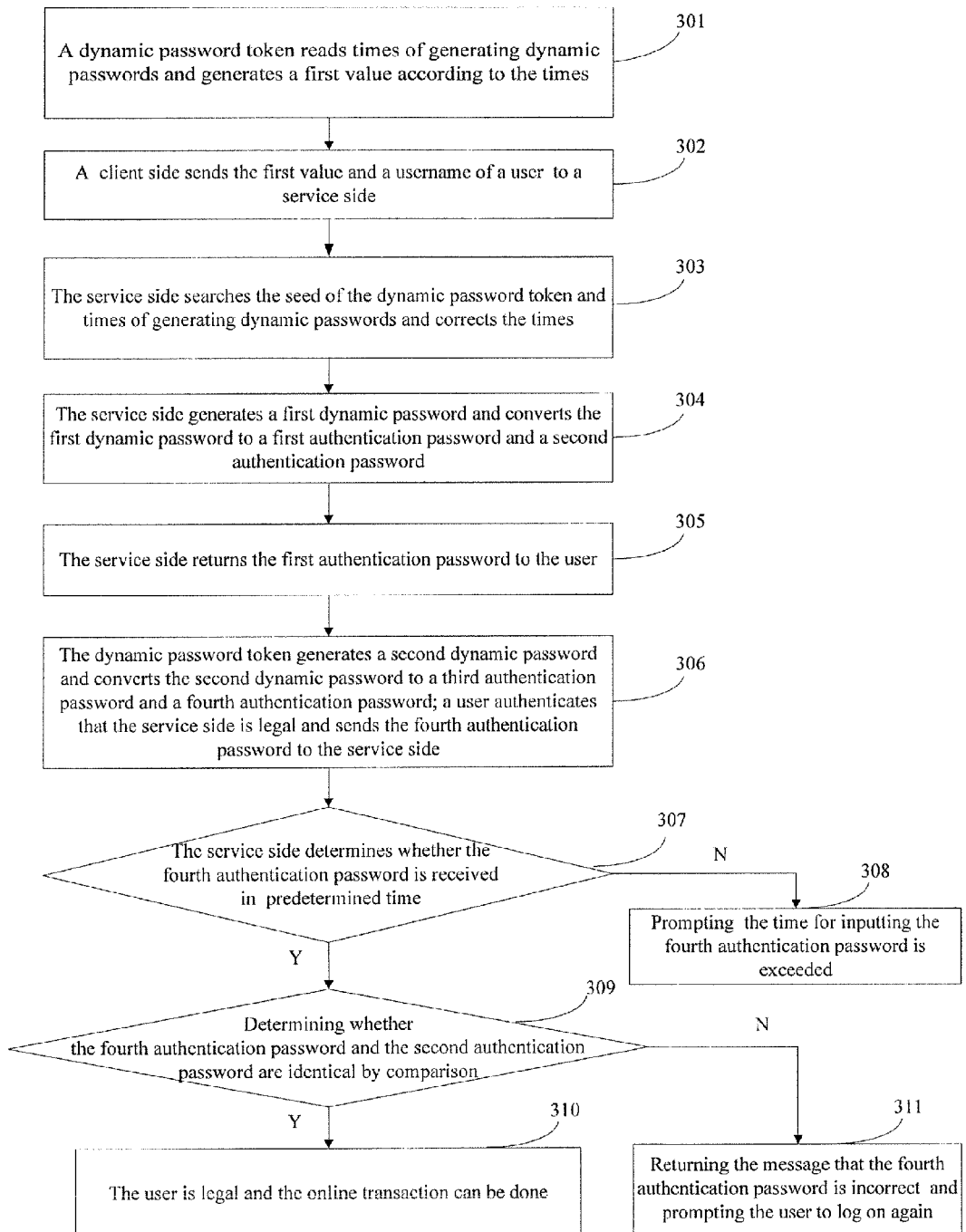
FIG. 3 is a flow chart illustrating an authentication method provided by Embodiment 3.

The embodiment 3 provides an authentication method for logging on online-bank with a dynamic password token, as explained in the embodiment 2. In the embodiment 3, the first value is generated by the dynamic password token according to the times of generating dynamic passwords and is not the random number in the embodiment 2. Referring to FIG. 3, the authentication method includes the following steps:

Step 301, the dynamic password token reads its stored times of generating dynamic passwords, and generates the first value according to the times of generating dynamic passwords;

Preferably, in the embodiment 3, the method that the first value is generated by the dynamic password token is as the following: For example, the times of generating dynamic passwords by the dynamic password token is 6322. When a user presses a press key of the dynamic password token for the first time, the dynamic password token will set the last two digits of 6322 to be the first value, and display the first value 22 on the display of the dynamic password token;

The method of outputting the first value is convenient with pretty good privacy. Alternatively, all of the digits of the times of generating dynamic passwords by the dynamic password can be output as the first value.

Step 302, the client side sends the first value and the username of the user to the service side;

In the embodiment 3, the user inputs the first value and the username to the input device of the client side and sends the first value and the username to the service side via the client side; the username includes at least one of the following: user account, identification number, and email;

Step 303, the service side searches the information of the dynamic password token bonded with the username according to the username, gets the number of the dynamic password token, seed and the times of generating dynamic passwords at the service side, and corrects the times of generating dynamic passwords stored at the service side;

In the embodiment 3, after the dynamic password token bonds with the username, the service side stores the number of the dynamic password token, the seed and the times of generating the dynamic passwords. In addition, the service side also stores the corresponding relationship between the username and the dynamic password token number. When the service side receives the username and the times of generating dynamic passwords, the service side searches the corresponding dynamic password token number and the seed and reads its times of generating dynamic passwords, for example, 6320. Taking the example that the first value input by the user is the last two digits of the times of generating dynamic passwords generated by the dynamic password token, the service side corrects the times of generating dynamic passwords in the following ways:

A, when the last two digits of the times of generating dynamic passwords stored at the service side is less than the first value, the service side will substitute the last two digits with the first value, for example, if the first value is 22, the times of generating dynamic passwords stored at the service side is corrected to be 6322;

B, when the last two digits of the times of generating dynamic passwords stored at the service side is bigger than the first value, the service side will substitute the last two digits with the first value and then plus 100 in addition. For example, if the first value is 15, the times of generating a dynamic password stored at the service side is corrected to be 6415;

C, when the last two digits of the times of generating dynamic passwords stored at the service side equals to the first value, the service side regards that the times stored at the service side is identical to the times of generating dynamic passwords stored at the dynamic password token;

Thereby, if the times of generating dynamic passwords stored at the dynamic password token is 100 bigger or more than the times of generating dynamic passwords stored at the service side, it will be regarded that the error between the times stored at the dynamic password token and the times stored at the service side is too big, so that the dynamic password token and the username should be bonded again;

Step 304, the service side generates a first dynamic password according to the corrected times of generating dynamic passwords and the seed, and converts the first dynamic password to a first authentication password and a second authentication password;

Thereby, the algorithm for generating the first dynamic password can be HMAC, MD5, SHA-1, or SHA-2;

In the embodiment 3, the predetermined rule for converting the first dynamic password to the first authentication password and the second authentication password is same as the predetermined rule of Embodiment 2. No more detail is given here.

Step 305, the service side sends the first dynamic password to the client side, and the client side outputs the first dynamic password;

In the embodiment 3, the client side outputs the first dynamic password by display or audio broadcast;

Step 306, the dynamic password token generates a second dynamic password, converts the second dynamic password to a third authentication password and a fourth authentication password, and outputs the third authentication password and the fourth authentication password;

In the embodiment 3, the dynamic password token generates the second dynamic password by using the times of generating dynamic passwords and the seed, which are stored in the token, according to the dynamic password algorithm; thereby, the dynamic password algorithm for generating a second dynamic password is same as the algorithm for generating the first dynamic password in step 304;

In the embodiment 3, the predetermined rule in the step 304 is same as the predetermine rule for converting the first dynamic password to the first authentication password and the second authentication password in step 304. No more detail is given here.

The user compares the third authentication password and the first authentication password. If the third authentication password and the first authentication password are identical, the fourth authentication password is input to the client side; otherwise, the service side is regarded to be illegal and the process of logon is stopped.

Step 307, the service side determines whether the fourth authentication password is received in a predetermined time, if yes, go to step 309, if no, go to step 308;

In the embodiment 3, the predetermined time is the valid time for the client side to receive the fourth authentication password;

Step 308, returning the error message to the client side and prompting the user that the time for inputting the fourth authentication password is expired;

Step 309, the service side compares the second authentication password and the fourth authentication password and determines whether they are identical; if yes, go to step 310; otherwise, go to step 311;

Step 310, the user is legitimate and online transaction can be executed; Step 311, returning the message that the fourth authentication password is incorrect and prompting the user to logon again;

If the user logs on again upon the received message, the procedure needs to repeat the steps above. If the number of failure for the service side to authenticate the fourth authentication password reaches a maximum value, which is a predetermined value; or the times that the user logs on exceeds the predetermined maximum value, the user is forbidden to log on.

The embodiment 3 further includes that the user inputs a static password via the client side and sends the static password to the service side; the service side authenticates the fourth password and the static password as well; if both the two passwords are correct, the user is legal; otherwise, the user is not legal and the logon is failed.

In the embodiment 3, the dynamic password is converted to two authentication passwords by which the client side and the services side authenticate each other, which improve the safety that preventing the phishing at the network in the dynamic password identification.

Embodiment 4

Figure 4:
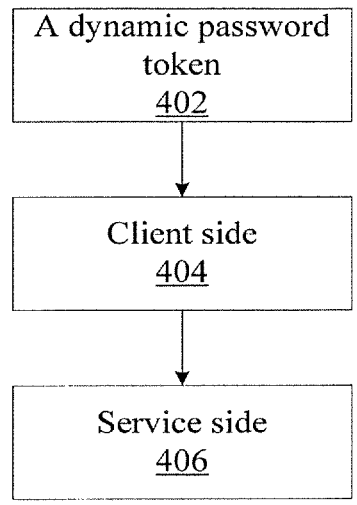
FIG. 4 is a structural diagram illustrating of an authentication system provided by Embodiment 4.

The embodiment 4 provides an authenticating system or a secure transaction system. Referring to FIG. 4, the system includes a dynamic password token 402, a client side 404, and a service side 406. Thereby, the dynamic password token 402 is for generating a first value, generating a second dynamic password according to a dynamic factor and a pre-stored seed and converting a second dynamic password to a third authentication password and a fourth authentication password according to a predetermined rule;

In the embodiment 4, the dynamic password token 402 can generate a first value and the second dynamic password when the token is triggered by a user. For example, the user presses a special key of the dynamic password token 402 for the first time to generate the first value; the user presses the special key for the second time to generate the second dynamic password; or the user presses a first special key of the token to generate the first value; the user presses a second special key of the token to generate the second value;

The client side 404 is for receiving the information input by the user and sending the information, which includes a username, the first value and a fourth authentication password, to the client side 406 and outputting the information returned by the service side 406 to the user;

The client side 404 is connected to the service side 406 by the internet and the client side 404 has an input device and an output device. The input device is for receiving the information input by the user and sending the information to the service side 406 via the internet. The input device can be a keyboard, etc. The output device is for outputting the information received by the service side 406 to the user. The outputting device can be a display or an audio player, etc.

The service side 406 is for receiving the username and the first value from the client side 404, searching for the seed of the dynamic password token corresponding to the username, converting the first dynamic password to the first authentication password and the second authentication password, and returning the first authentication password to the client side 404; the first authentication password is for the user to determine that the service side 406 is legal when the user determines that the first authentication password and the third authentication password are identical by comparison.

The service side 406 is further for confirming that the user is legal when the fourth authentication password and the second authentication password are identical.

The predetermined rule of the service side 406 is same as that of the dynamic password token 402, which assures that the legal service side and the dynamic password token can authenticate each other. The rule is same as the rules of Embodiments 1, 2, or 3. No more details are given here.

In the embodiment 4, the dynamic password is converted to two authentication passwords by which the client side and the services side authenticate with each other, which improves the safety that preventing the phishing at the network in the dynamic password identification.

Embodiment 5

Figure 5:
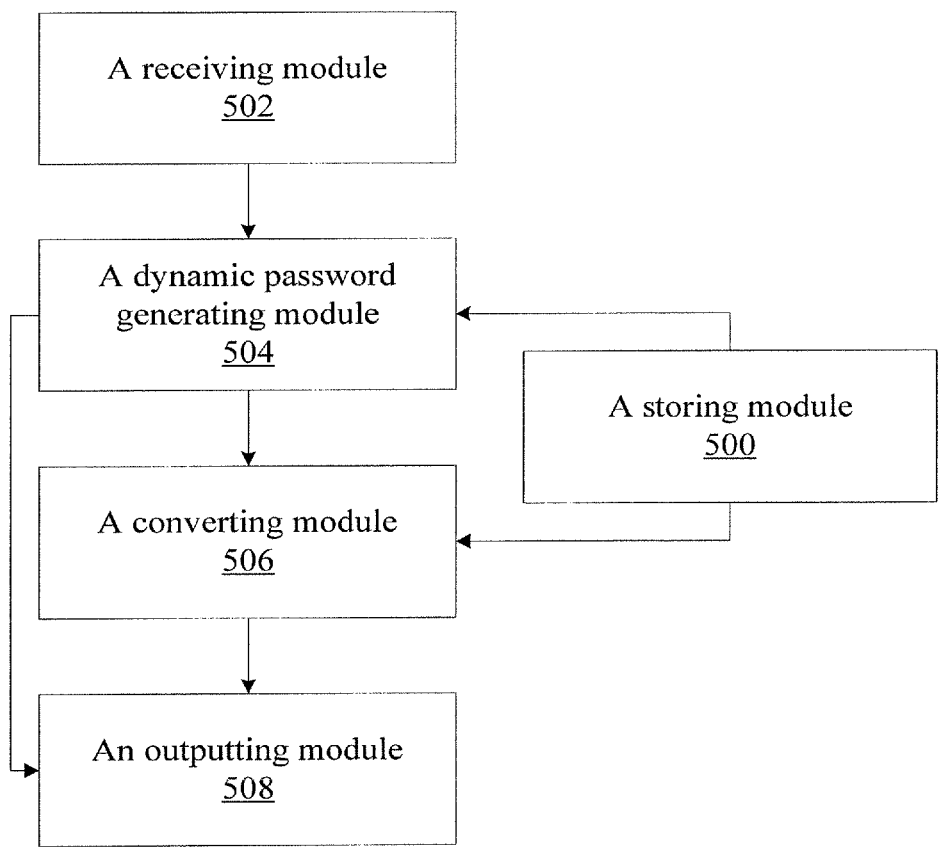
FIG. 5 is a structural diagram illustrating of an authentication system provided by Embodiment 5.

The embodiment 5 provides an authentication device. Specifically, the authentication device can be the dynamic password token in the embodiment above. Referring to FIG. 5, the device includes a storing module 500 for storing association information, which includes a seed and an algorithm for generating dynamic passwords and a predetermined rule for converting a dynamic password to authentication passwords;

a receiving module 502 for receiving the confirming information input by the user; a dynamic password generating module 504 for generating a first value when the receiving module 502 receives a first confirming information and generating a second dynamic password according to a dynamic factor and the seed stored in the storing module 500 when the receiving module 502 receives the second confirming information input by the user;

a converting module 506 for converting the second dynamic password, which is generated by the dynamic password generating module 504, to a third authentication password and a fourth authentication password according to a predetermined rule; and an outputting module 508 for outputting the first value generated by the dynamic password generating module 504 when the receiving module 502 receives the first confirming information input by the user, outputting the third authentication password and the fourth authentication password after the converting module 506 got the converted third authentication password and fourth authentication password, and confirming that the service side is legal and returning the fourth authentication password to the service side when the user determines that the first authentication password and the third authentication password generated by the service side are identical.

The storing module in the embodiment 4 is further used for storing the times of generating dynamic passwords or a generated random number, which are used for generating the first value;

Thereby, the converting module 506 includes a third authentication password generating unit for taking the bytes with preset length out from the second dynamic password generated by the dynamic password generating module 504 and converting the taken bytes to letters and setting the letters to be the third authentication password;

a fourth authentication password generating unit for taking the rest part, which is the rest bytes in the second dynamic password after the third authentication password generating unit taken some bytes, in the second dynamic password, and sets the rest part to be the fourth authentication password.

The stored algorithms for generating a password and converting the dynamic password to authentication password and the corresponding algorithms in other embodiments are identical. No more detail is given here.

The service side in the embodiment 5 can have the functions of the service side of the embodiment 4. The authentication device converts the second dynamic password to the third authentication password and the fourth authentication password. The user can compare the first authentication password of the service side and the third authentication password to determine whether the service side is legal, which prevents the attack from some malicious websites such as phishing websites, etc. The user sends the fourth authentication password to the service side and the service side authenticating the legality of the user, which assures that the user's log on the service side is legal and assures the safety of the user information and user property.

For what is described above, the following technical effect can be achieved by the embodiment above.

The dynamic password is converted to two authentication passwords with which the client side and the services side authenticate each other, which improves the safety that preventing the phishing at the network in the dynamic password identification.

Embodiment 6

Figure 6:
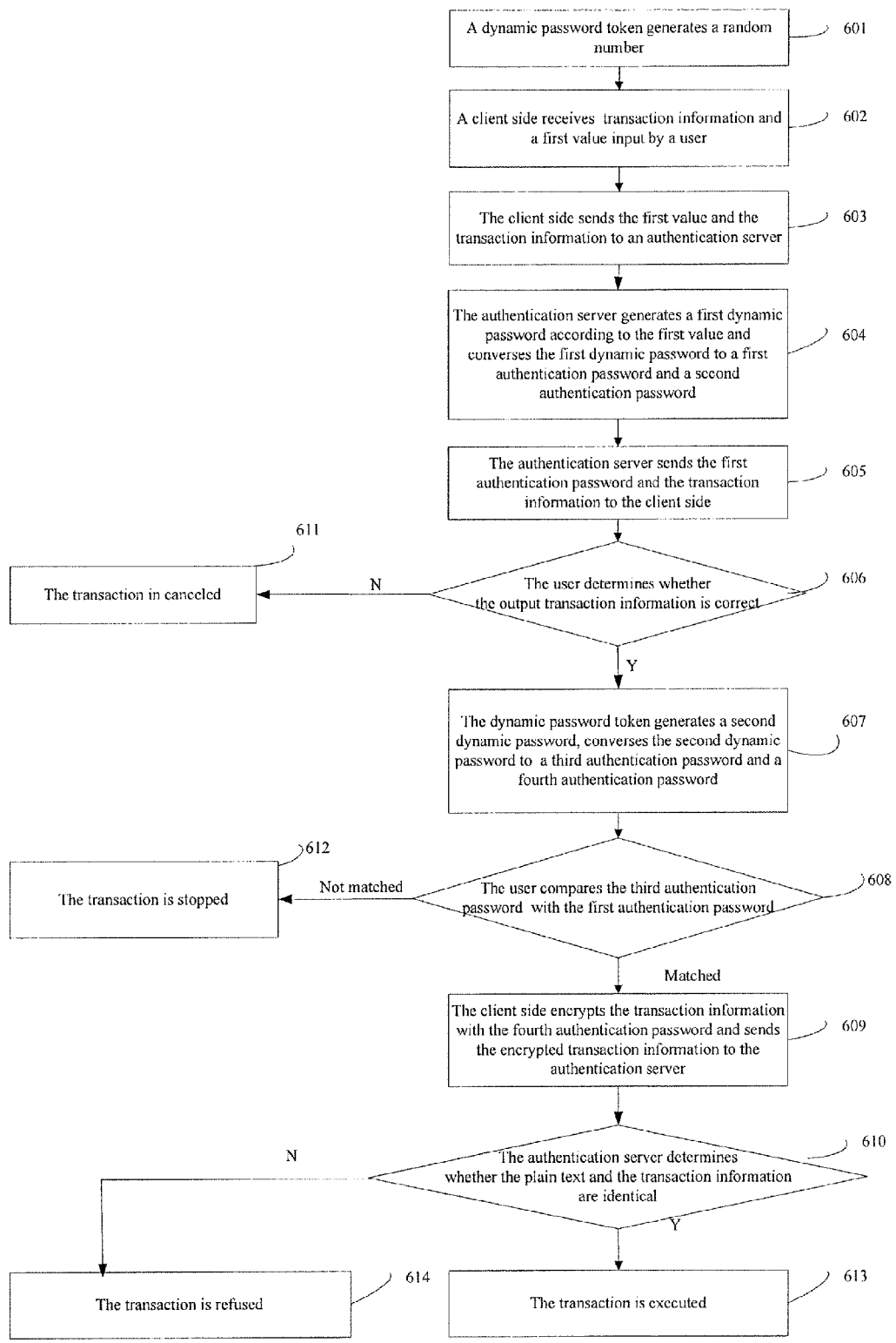
FIG. 6 is a flow chart illustrating a method for secure transaction provided by Embodiment 6.

The embodiment 6 of the invention provides a method for safe transaction. The method provides security for the user in the process of online transaction by using a dynamic token and an authentication server. Thereby, it should be noted that every dynamic password token has a unique number and has a stored seed in the embodiment 6. The seed is a dynamic factor for generating a dynamic password by the dynamic password token. The seeds stored in the dynamic password tokens are different from each other. The authentication server pre-stores a number and a seed of the dynamic password token which are corresponding to a user account. Referring to FIG. 6, the method includes:

Step 601, the dynamic password token generates a random number, takes the random number for a first value, and stores the random number;

Thereby, the dynamic password token provided by the embodiment 6 is an offline dynamic password generating device, which has no physical connection with a client side. The data generated and displayed by the dynamic password token is input to the client side by a legal holder of the dynamic password token.

It should be noted that there are many ways for the dynamic password to generate a random number. For example, there is a press key on the dynamic password token. When the user presses the press key for the first time, the dynamic password token generates a random number according to an inbuilt algorithm; thereby, the random number can be a number with, but not limited to, 2 to 8 digits.

Step 602, the client side receives transaction information and a first value input by the user;

Thereby, the user can input the transaction information and the first value, which is the random number generated by the dynamic password token in step 601, to the client side. The transaction information includes, but not limited to, a user account, a user password, transaction sum, and currency type, etc.

Step 603, the client side sends the first value and the transaction information to the authentication server;

Thereby, the authentication server authenticates the identity of the user and the predetermined rule for the authentication server to generate a dynamic password is identical to that of the dynamic password token.

Step 604, the authentication server generates a first dynamic password according to the first value and converts the first dynamic password to a first authentication password and a second authentication password according to the predetermined rule;

Thereby, that the authentication server generates a first dynamic password according to the first value includes that the authentication server searches for the dynamic password token number bonded with the user account in the received transaction information and searches for the seed of the dynamic password token according to the dynamic password token number;

the authentication server generates a first dynamic password token according to the dynamic password generating algorithm by using the searched seed and the first value (the random number).

Further more, that the authentication server searches for the seed of the dynamic password token held by the user according to the user account includes that when the user bonds the dynamic password token and the user account together, the service side builds corresponding relationship between the user account and the dynamic password token. The authentication sever can find the corresponded dynamic password token seed according to the user account directly.

In the embodiment 6, for example, the generated first dynamic password is 8 digits. The server generates a first dynamic password by using the first value and a seed corresponding to the dynamic password token in step 601. The algorithm for generating a dynamic password includes HMAC-SHA1, MD5, SHA-1, and SHA-256, etc.

Preferably, the predetermined rule can be that the authentication server takes data with preset length out from the first dynamic password and converts the data to letters and sets the letters to be the first authentication password and sets the rest data of the first dynamic password to be the second authentication password;

Preferably, the predetermined rule can be also that the data with preset length taken out from the first dynamic password is used as the first authentication password, the rest data converted to letters which are used as the second authentication password;

It should be noted that the first authentication password and the second authentication password can be in any forms besides letters or numbers. No limitation is regulated in the present invention.

For example, the first dynamic password is 65882632. Taking out the first three digits 6, 5, and 8 from the first dynamic password, combining the first digit and the second digit, combining the first digit and the third digit, and combining the second digit and the third digit, so as to get three numbers 65, 68, and 58. Dividing the three numbers by 26 to get three remainders 13, 16, and 6, respectively. Setting the 26 letters A-Z (case insensitive) to correspond to the numbers 1-26, respectively. According to the corresponding relationship between the letters and the numbers, three letters M, P, and F can be got from the three remainders. The first authentication password is MPF and the rest part 82632 of the first dynamic password is set to be the second authentication password.

If the dynamic password token has a segmented display in step 601, the step 601 further includes converting the first password to a seven-segment-code. For example, the segmented display can indicate the letters to be A, b, C, d, E, F, and P (case insensitive), and the letter can be set to be corresponded with the number 1-7. As the same method described above, taking the first three number 6, 5, and 8 out from the first dynamic password 65882632; combining the first digit and the second digit, combining the first digit and the third digit and combining the second digit and the third digit to get three numbers 5, 68, and 58. The three numbers are divided by 7 respectively to get the three reminders 2, 5, and 2. According to the corresponding relationship between the numbers and the letters described above, it can be inferred that the first authentication password is bEb which is corresponding to the remainder 2, 5, and 2; the rest digits of the first dynamic password, that is 82632, is set to be the second authentication password.

Step 605, the authentication server sends the first authentication password and the transaction information to the client side;

Step 606, the client side receives the first authentication password and the transaction information sent from the authentication server and outputs the transaction information for the user to determine whether the transaction information is correct;

If yes, the user sends confirming signal to the client side; Otherwise, go to step 611.

It should be noted that the way that the client side outputs the transaction information includes, but not limited to, displaying, audio broadcasting, and the like.

The user determines whether the transaction information output by the user includes that the user determines whether the transaction information output by the client side accords with the transaction information submitted in step 601.

If the determining result is positive, the user can confirm the transaction information output by the client side via the way of pressing a key or voice, and the like.

Step 607, the dynamic password token generates a second dynamic password, converts the second dynamic password to a third authentication password and a fourth authentication password according to a pre-determined rule, and outputs the third authentication password and the fourth authentication password simultaneously;

There are many ways for making the dynamic password token to generate a second dynamic password. For example, when the user presses the key of the dynamic password token for the second time, and the dynamic password token generates the second dynamic password. The process of generating the second dynamic password can includes that the dynamic password token generates a second dynamic password by using the random number generated in step 601 as a dynamic factor and the seed stored in the dynamic password token according to the dynamic password generating algorithm; thereby, the dynamic password generating algorithm is the same as the algorithm for generating the first dynamic password by the authentication serve in step 604.

The method for converting the second dynamic password to the third authenticating password and the fourth authenticating password according to a predetermined rule is the same as the method described in step 604. No more detail is given here. The third authentication password and the fourth authentication password are output by the display of the dynamic password token simultaneously. For example, if the dynamic password token has a segmented display, the two passwords are output as bEb82632;

Step 608, the user compares the third authentication password output by the dynamic password token with the first authentication password, which is sent from the authentication server, received by the client side;

if the two passwords are identical, the authentication server is legitimate, go to step 609; and if the two password are not identical, the authentication server is not legitimate, go to step 612;

Step 609, the user inputs the fourth authentication password to the client side; the client side encrypts the transaction information with the fourth authentication password and sends the encrypted information to the authentication server;

Step 610, the authentication server decrypts the received encrypted information with the second authentication password to get plain text and determines whether the plain text and the transaction information are identical;

If yes, go to step 613; and
If no, go to step 614.

In the embodiment 6, the client side and the authentication server perform encryption and decryption with a predetermined and same encryption and decryption algorithm, for example, AES, RSA, 3DES, and the like.

Step 611, the user cancels the transaction;
Step 612, the user stops the transaction;
Step 113, the transaction is executed;
Step 114, the transaction is refused.

The embodiment 6 provides a method for secure transaction, by which the identification is authenticated and the security for transaction information is guaranteed by the mutual authentication between the authentication server and the client side and signature operation. The method further prevents the user from being spoofed and the transaction information is tampered, etc.

Embodiment 7

Figure 7:
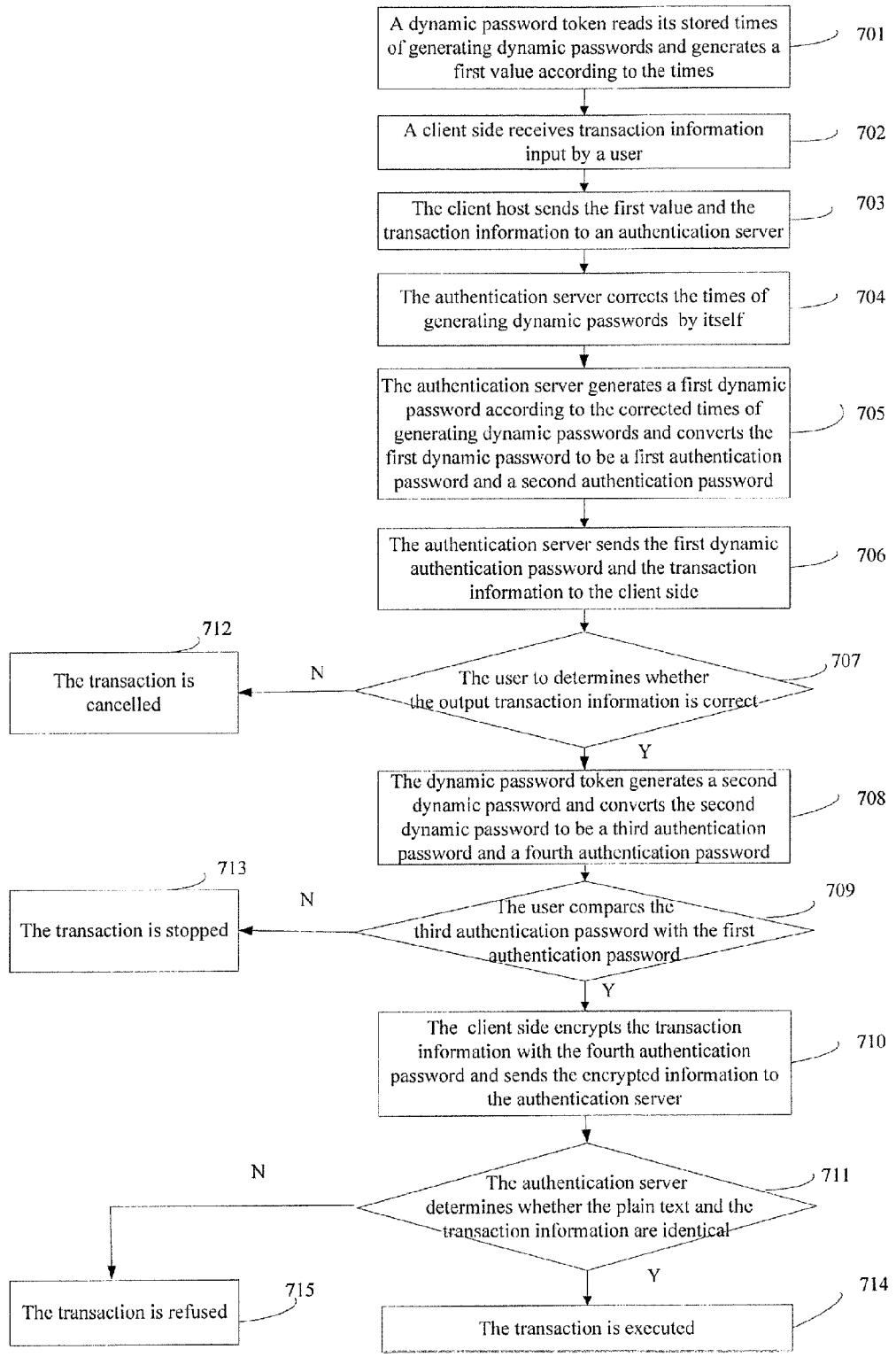
FIG. 7 is a flow chart illustrating a method for secure transaction provided by Embodiment 7.

The embodiment 7 provides a method for secure transaction, by which the security for a user in the network transaction is realized by a dynamic password token and an authentication server. Thereby, it should be noted that each dynamic password token provided by the embodiment 7 has a unique number and stores a seed which is a static parameter for the dynamic password token to generate a dynamic password by using dynamic password algorithm. Each dynamic password token has a unique seed. The authentication server pre-stores the number and the seed of the dynamic password token corresponding to a user account and a dynamic password algorithm which is identical to the dynamic password algorithm stored in the dynamic password token. Referring to FIG. 7, the method includes Step 701, the dynamic password token reads the stored times of generating dynamic passwords and generates a first value according to the times;

Preferably, in the embodiment 7, the dynamic password token outputs the first value in the following way. For example, the times of generating dynamic passwords is 6322. When the user presses a key of the dynamic password token (or other trigger method) for the first time, the dynamic password token sets the last two digits of 6322 to be the first value and outputs the first value 22 via the display of the dynamic password token. The method for outputting the first value above is convenient and with high secrecy.

Of course, the embodiment 7 is not limited to the last two digits of the times. The last three digits, the last four digits or even all digits of the times can be output as the first value.

Step 702, the client side receives transaction information input by the user; Thereby, the user can input the transaction information into the client side by an input device of the client side. The transaction information can include a user account, a user password, transaction sum, and currency type, etc.

Step 703, the client side sends the first value and the transaction information to the authentication server;

Step 704, the authentication server corrects the times of generating dynamic passwords which are generated by itself;

In the embodiment 7, the authentication server corrects the times of generating dynamic passwords of its own according to the number of the digits of the received first value.

It should be noted that when the dynamic password token is bonded with the user account, the authentication server has stored the number and the seed of the dynamic password token and the times of generating dynamic passwords and stores the corresponding relationship between the user account and the number of the dynamic password token. When the authentication server receives the user account and the times of generating dynamic passwords in the transaction information, the authentication server searches the corresponding number of the dynamic password token and the seed according to the user account and reads the times of generating dynamic passwords of its own, for example, 6320. For example, the first value input by the user is the last two digits of the times of generating dynamic passwords by the dynamic password token and the authentication server corrects the times of generating dynamic passwords of its own in the following way:

(1) when the last two digits of the times of generating dynamic passwords stored in the authentication server is smaller than the first value, the last two digits of the times of generating dynamic password stored in the authentication server is substituted by the first value; for example, in the embodiment 7, if the first value is 22, the times of generating dynamic passwords stored in the authentication server is corrected to be 6322;

(2) when the last two digits of the times of generating dynamic passwords stored in the authentication server is bigger than the first value, the last two digits of the times of generating dynamic passwords stored in the authentication server is substituted by the first value and plus 100; for example, if the first value is 15, the times of generating dynamic passwords stored in the authentication server is corrected to be 6415;

(3) if the last two digits of the times of generating dynamic passwords stored in the authentication server is equal to the first value, it can be regarded that the times of generating dynamic passwords stored in the authentication server matches the times of generating dynamic passwords stored in the dynamic password token.

Thereby, if the times of generating dynamic passwords stored in the dynamic password token is 100 or much bigger than the times of generating dynamic passwords stored in the dynamic password token, it is regarded that big times difference exists between the authentication server and the dynamic password token. In this case, the dynamic password token needs to be bond with the username again. This case is ignored in the invention.

It should be noted that the embodiment 7 sets the last digits of the actual times as the first value. Those skilled in the art can infer that the first value can be the last digit or the last three digits, and so on, of the actual times, which is also in the scope of protection of the invention. No more detail is given here. If the first value is the times of generating dynamic passwords generated by the dynamic password token, the authentication server will correct the times of generating dynamic passwords by its own to be the times of generating dynamic passwords, which is 6322.

Step 705, the authentication server generates the first dynamic password according to the corrected times of generating dynamic passwords and the seed and converts a first dynamic password to a first authentication password and a second authentication password according to a predetermined rule.

In the embodiment 7, for example, the first dynamic password has 8 digits. The authentication server generates the times of generating dynamic passwords and the seed corresponding to the dynamic password token in step 701. The algorithm applied in the embodiment 7 can be HMAC-SHA1, MD5, SHA-1, or SHA-256, etc.

Preferably, the predetermined rule can be that the authentication server takes data with preset length out from the first dynamic password, converts the taken data to letters, sets the letters to be the first authentication password and sets the rest data of the first dynamic password to be the second authentication password;

Preferably, the predetermined rule can also be that the data with preset length taken from the first dynamic password is used to be the first authentication password, and the rest data converted to letters is used to be the second authentication password.

It should be noted that the authentication passwords can be in letters or numbers. Furthermore, the authentication passwords including the first authentication password and the second authentication password may be in other character forms. No inflexible rule is regulated in the present invention.

For example, the first dynamic password is 65882632. Taking the first three numbers 6, 5, and 8 from the dynamic password 65882632, and then assembling the first and the second digit, assembling the second and the third digit, and assembling the second and third digit to get three numbers 65, 68, and 58. Dividing the three numbers by 26 to get three remainders 13, 16, and 6, respectively. Setting the 26 letters A-Z to correspond to the numbers 1-26 (case-insensitive). According to the corresponding relationship, the three letters corresponding to the three remainders are M, P, and F. The first authentication password is MPF. The rest part of the first dynamic password, that is, 82632 is set to be the second authentication password;

If the display of the dynamic password token is a segmented display in step 701, the first authentication password can be converted to seven-segment code. If the segmented display can indicate seven letters A, b, C, d, F, and P (case-insensitive), the seven letters are corresponding to seven numbers 1-7. Taking the first three digits 6, 5, and 8 out from the first dynamic password 65882632; assembling the first digit and the second digit, assembling the first digit and the third digit, and assembling the second digit and the third digit to get three numbers 65, 68, and 58, dividing the three numbers by 7 respectively to get three remainders 2, 5, and 2. According to the letters corresponding to the three numbers, the first authentication password is bEb; Setting the rest part of the first dynamic password 82632 to be the second authentication password;

Step 706, the authentication server sends the first dynamic authentication password and the transaction information to the client side;

Step 707, the client side receives the first authentication password and the transaction information and outputs the transaction information for the user to determine whether the transaction information is correct;

If so, the user sends confirm signal to the client side;

Otherwise, goes to step 712.

Thereby, it should be noted that the ways that the client side outputs the transaction information include but not limited to display, audio broadcast, etc.

The process that the user determines whether the output transaction information is correct includes that the user determines whether the transaction information output by the client side accords with the transaction information submitted in step 702.

If the result of determination is positive, the user can confirm the transaction information by key pressing or voice.

Step 708, the dynamic password token generates a second dynamic password, and converts the second dynamic password to a third authentication password and a fourth authentication password, and outputs the third authentication password and the fourth authentication password simultaneously.

Many ways can be used to generate a second dynamic password by the dynamic password token. For example, the user presses a key of the dynamic password secondly to generate a second dynamic password. The process of generating a second dynamic password can includes that the dynamic password token takes the times of generating dynamic passwords in step 701 as dynamic factor and the seed stored in the token to generate a second dynamic password according to the dynamic algorithm. Thereby, the algorithm for generating the second dynamic password is identical to the algorithm for generating the first dynamic password generated by the authentication server in step 705.

The way of converting the second dynamic password to the third authentication password and the fourth authentication password is the same as what is described in step 705. No more detail is given here. The dynamic password token outputs the third authentication password and the fourth authentication password simultaneously. For example, when the dynamic password token has a segmented display, the form of outputting the passwords is bEb82632;

Step 709, the user compares the third authentication password with the first authentication password;

If the two passwords are identical, the authentication server is legal and go to step 710;

If the two passwords are not identical, the authentication server is not legal and go to step 713;

Step 710, the user inputs the fourth authentication password to the client side and the client side encrypts the transaction information according to the fourth authentication password and sends the encrypted information to the authentication server;

Step 711, the authentication server decrypts the received encrypted information according to the second authentication password to get the plain information and determines whether the plain information is identical to the transaction information;

If yes, go to step 714;

If no, go to step 715.

In the embodiment 7, the client side and the authentication server perform encryption and decryption with the preset and identical encryption and decryption algorithm such as AES, RSA, or 3 DES.

Step 712, the user cancel the transaction;

Step 713, the user stops the transaction;

Step 714, the transaction is executed;

Step 215, the transaction is refused.

It should be further noted that, if the dynamic password token outputs the times of generating dynamic passwords completely as the first value, the authentication server needs not store the times of generating dynamic passwords stored by itself and needs not correct its times of generating dynamic passwords as well. So that the steps 701 to 705 can be substituted by the following steps:

Step 701', the dynamic password token reads the times of generating dynamic password of its own, and outputs the times as the first value;

Step 702', the client side receives the transaction information input by the user;

Step 703', the client side sends the first value and the transaction information to the authentication server;

Step 704', the authentication server generates the first dynamic password according to the times of generating the dynamic password and the seed and converts the first dynamic password to the first authentication password and the second authentication password according to the predetermined rule.

The embodiment 7 provides a method for secure transaction, by which the identification is authenticated and the security for transaction information is guaranteed by the mutual authentication between the authentication server and the client side and signature operation. The method further prevents the user from being spoofed and the transaction information is tampered, etc.

Embodiment 8

Figure 8:
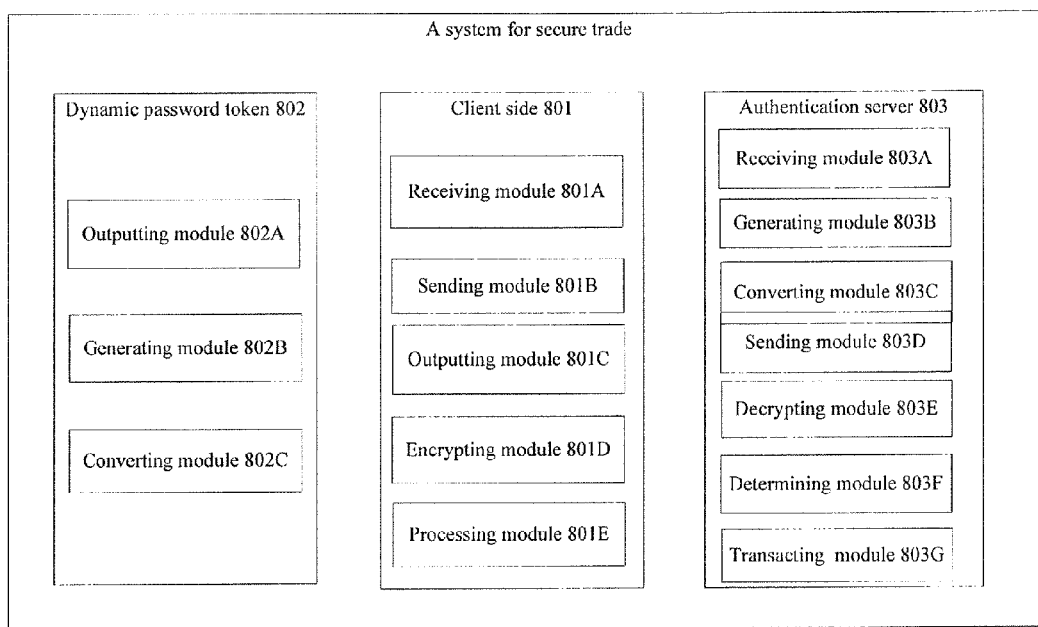
FIG. 8 is a flow chart illustrating a secure transaction system provided by Embodiment 8.

Referring to FIG. 8, the embodiment 8 of the invention provides a system for secure transaction, which includes a client side 801, a dynamic password token 802, and an authentication server 803;

The dynamic password token 802 includes
an output module 802A for outputting a first value;
a generating module 802B for generating a second dynamic password according to a dynamic factor and a pre-stored seed; and
a converting module 802C for converting the second dynamic password generated by the generating module 802B to a third authentication password and a fourth authentication password;

The client side includes
a receiving module 801A for receiving the transaction information input by the user;
a sending module 801B for sending the first value output by the output module 802A and transaction information received from the receiving module 801A to the authentication server 803;
the receiving module 801A being further for sending the first authentication password and the transaction information sent from the authentication server 803;
an outputting module 801C for outputting the first authentication password and the transaction information received by the receiving module 801A;
the receiving module 801A being further for receiving signal sent from the user for indicating whether the third authentication password and the first authentication password are identical;
an encrypting module 801D for encrypting the transaction information with the fourth authentication password to get the encrypted information;
the sending module 801B being for sending the encrypted information to the authentication server 803; and
a processing module 801E for canceling the transaction if the received signal received by the receiving module 801A indicates that the third authentication password and the first authentication password are not identical;

The authentication server 803 includes
a receiving module 803A for receiving the first value and the transaction information sent by the sending module 801B of the client side;
a generating module 803B for generating the first dynamic password according to the first value received by the receiving module 803A of the authentication server 803;
a converting module 803C for converting the first dynamic password generated by the generating module 803B of the authentication server 803 to be the first authentication password and the second authentication password;
a sending module 803D for sending the first authentication password and the transaction information converted by the converting module 803C of the authentication server 803 to the client side 801;
the receiving module 803A being further for receiving the encrypted information sent from the client side 801;
a decrypting module 803E for decrypting the encrypted information by using the second authentication password to get the plain information;
a determining module 803F for determining whether the plain information and the stored transaction information are identical;
a transacting module 803G for executing the transaction if the determining module 803F gets a positive result and refusing the transaction if the determining module 803F gets a negative result.

Thereby, the dynamic factor is a random number or the times of generating dynamic passwords by the dynamic password token.

If the dynamic factor is a random number, the first value is the random number;

If the dynamic factor is the times of generating dynamic passwords generated by the dynamic password token, the first value is gotten by the dynamic password token according to the times.

Correspondingly, the generating module 802B of the dynamic password token 802 specifically for, if the dynamic factor is a random number, generating the second dynamic password according to the dynamic password generating algorithm by using the seed stored in the dynamic password token and the random number; and if the dynamic factor is the times of generating dynamic passwords by the dynamic password token, correcting the times of generating dynamic passwords stored at the authentication server by using the first value; thereby, the authentication server generating the second dynamic password according to the dynamic password generating algorithm by using the corrected times of generating dynamic passwords and the found seed.

Correspondingly, the converting module 803C of the authentication server 803 is for taking data with preset length from the first dynamic password and converting the taken data to letters and setting the letters to be the first dynamic password and setting the rest data of the first dynamic password to be the second authentication password;

or taking the data with preset length out from the first dynamic password and converting the rest data to letters and setting the letters to be the second authentication password.

Correspondingly, the converting module 802C of the dynamic password token 802 is for taking data with preset length from the second dynamic password, converting the taken data to letters, setting the letters to be the third authentication password and setting the rest data of the dynamic password to be the fourth authentication password;

or taking data with preset length out from the second dynamic password, setting the taken data to be the third authentication password and converting the rest data to letters and setting the letters to be the fourth authentication password.

Thereby, the encrypting algorithm used by the client side 801 and the decrypting algorithm used by the authentication server 803 are predetermined by the client side 801 and the authentication server 803.

The embodiment 8 of the invention provides a method for secure transaction, by which the identification is authenticated and the security for transaction information is guaranteed via mutual authentication between the authentication server and the client side and signature operation. The method further prevents fake identification and faked or tampered information, etc.

Apparently, those skilled in the art should know that the modules and the steps above can be realized by general computing device. They can be concentrated on a single computing device or distributed on the network made up by several computing devices. Optionally, they can be realized by a program code which can be executed by the computing device, so that they could be stored in the storing device and executed by the computing device; or they can be made to be integrated circuit module respectively; or several modules or steps of them is made to be a single integrated circuit module, so that the invention is not limited to combination of any specified hardware or software.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. An authentication method, wherein the method comprises receiving, by a server, transaction data and a first value entered by a user from a client, in which the first value is got according to a dynamic factor by a dynamic password token and the transaction data comprises a username;

searching, by the server, for a seed of the dynamic password token corresponding to the transaction data, correcting the dynamic factor of the server according to the first value, generating a first dynamic password according to the corrected dynamic factor and the seed, and converting the first dynamic password to a first authentication password and a second authentication password according to a preset rule comprising taking data with preset length out from the first dynamic password, converting the taken data to letters and setting the letters to be the first authentication password, and setting the rest data of the first dynamic password to be the second authentication password; or taking, by the server, data with preset length out from the first dynamic password, setting the taken data to be the first authentication password, converting the rest part data of the first dynamic password to letters and setting the letters to be the second dynamic password;

returning, by the server, authentication information to the client and the authentication information comprising a first authentication password;

generating, by the dynamic password token, a second dynamic password according to the dynamic factor and the seed pre-stored in the dynamic password token, and converting the second dynamic password to a third authentication password and a fourth authentication password according to the preset rule comprising taking, by the dynamic password token, data with preset length out from the second dynamic password, converting the taken data to letters and setting the letters to be the third authentication password, and setting the rest data of the second dynamic password to be the fourth authentication password; or taking, by the dynamic password token, data with preset length out from the second dynamic password, setting the taken data to be the third authentication password, and converting the rest data of the second dynamic password to letters and setting the letters to be the fourth authentication password;

confirming, by the client, that the server is legitimate after determining, by the user, that the first authentication password and the third authentication password are identical; and authenticating the client or executing transaction, by the server, according to the fourth authentication password and the second authentication password.

2. The method of the claim 1, wherein said authenticating the client, by the server, according to the fourth authentication password and the second authentication password comprises sending, by the client, the fourth authentication password to the server; and confirming, by the server, that the user is legitimate if the server determines that the fourth authentication password and the second authentication password are identical.

3. The method of claim 1, wherein the transaction data further comprises transaction information, accordingly, the authentication information comprises the first authentication password and transaction information, accordingly, executing transaction by the server specifically comprises encrypting, by the client, the transaction information with the fourth authentication password to get encrypted text, and sending the encrypted text to the server; decrypting, by the server, the encrypted information with the second authentication password to get plain text; and executing transaction, by the server, if the server determines that the plain text and the transaction information are identical.

4. The method of claim 2, wherein the method further comprises determining, by the server, whether the fourth authentication password is received in a predetermined time, if yes, comparing the fourth authentication password and the second authentication password to determine whether they are identical; otherwise, sending the information indicating overtime for inputting password to the client.

5. The method of claim 2, wherein the method further comprises receiving, by the server, a static password entered by the user; and determining whether the static password is correct, if yes, comparing the fourth authentication password and the second authentication password to determine whether they are identical, if they are not identical, the user is not legitimate and the user is forbidden to login.

6. The method of claim 1, wherein the dynamic factor is a random number or times of generating dynamic passwords by the dynamic password token.

7. The method of claim 6, wherein if the dynamic factor is a random number, the first value is the random number; and if the dynamic factor is the times of generating dynamic passwords by the dynamic password token, the first value is got by the dynamic password token according to the times of generating dynamic passwords.

8. The method of claim 1, wherein said searching, by the server, a seed of the dynamic password token corresponding to the transaction data comprises finding, by the server, a dynamic password token number bonded with the user account according to the username in the transaction data; and finding the seed of the dynamic password token corresponding to the dynamic password token number according to the dynamic password token number.

9. The method of claim 6, wherein if the dynamic factor is a random number, correcting, by the server, the dynamic factor of the server according to the first value, and said generating a first dynamic password according to the corrected dynamic factor and the seed comprises using, by the server, the received first value as the dynamic factor, and generating the first dynamic password by using the first value and the seed;

if the dynamic factor is the times of generating dynamic passwords by the dynamic password token, correcting, by the server, the dynamic factor of the server according to the first value, and said generating a first dynamic password according to the corrected dynamic factor and the seed comprises correcting the times of generating dynamic passwords stored at the server according to the first value, and generating the first dynamic password according to the corrected times of generating dynamic passwords and the seed.

10. A secure transaction system, wherein the secure transaction system comprises a client, a dynamic password token, and a server, the dynamic password token comprises a first generating module for generating a first value according to the dynamic factor of the dynamic password token, further for generating a second dynamic password according to the dynamic factor and a pre-stored seed;

a first converting module for converting the second dynamic password generated by the first generating module to a third authentication password and a fourth authentication password wherein the first converting module of the dynamic password token is specifically for taking data with preset length from the second dynamic password by the dynamic password token, converting the taken data to letters and setting the letters to be the third authentication password, and setting the rest data of the dynamic password to be the fourth authentication password; or taking data with preset length from the second dynamic password as the third authentication password, converting the rest data of the second dynamic password to letters and setting the letters to be the fourth authentication password; and a first outputting module for outputting the first value generated by the first generating module, further for outputting the third authentication password and the fourth authentication password converted by the first converting module, the client comprises a first receiving module for receiving transaction data and the first value entered by the user and receiving the confirming information confirmed by the user that a first authentication password and the third authentication password converted by the first generating module of the dynamic password token are identical, the transaction data comprising a username;

the first receiving module being further for receiving authentication information sent by the server, the authentication information comprising the first authentication password; the first receiving module being further for receiving a determining signal sent by the user and indicating that whether the third authentication password and the first authentication password are identical;

a first sending module for sending the transaction data and the first value entered by the user and received by the first receiving module to the server;

a second outputting module for outputting the first authentication password sent by the server and received by the first receiving module, and the server comprises a second receiving module for receiving the first value and the transaction data sent by the sending module of the client;

a second generating module for generating the first dynamic password according to the first value received by the second receiving module of the server;

a second converting module for converting the first dynamic password generated by the second generating module of the server to the first authentication password and a second authentication password wherein the second converting module of the server is specifically for taking data with preset length from the first dynamic password and converting taken data to letters and setting the letters to be the first authentication password, and setting the rest data of the first dynamic password to be the second authentication password; or taking the data with preset length out from the first dynamic password as the first authentication password, converting the rest data of the first dynamic password to letters and setting the letters to be the second authentication password;

a second sending module for sending the authentication information to the client; and an authenticating and transacting module for authenticating the client or executing transaction by using the fourth authentication password and the second authentication password.

11. The system of claim 10, wherein the first sending module of the client is further for sending the fourth authentication password to the server;

accordingly, the authenticating and transacting module of the server is specifically for confirming the user is legitimate by determining that the fourth authentication password and the second authentication password are identical.

12. The system of claim 10, wherein the client further comprises an encrypting module for encrypting the received transaction data with the fourth authentication password to get encrypted information if the first receiving module receives the confirming information confirming that the first authentication password and the third authentication password converted by the first converting module of the dynamic password token are identical;

the first sending module of the client being further for sending the encrypted information to the server;

accordingly, the second sending module of the server for sending the authentication information to the client, thereby, the authentication information is the first authentication password and the transaction data;

the receiving module of the server further for receiving the encrypted information sent by the client;

in which the server further comprises a decrypting module for decrypting the encrypted information with the second authentication password to get plain text; and the authenticating and transacting module for executing transaction if the plain text and the transaction data are determined to be identical.

13. The system of claim 11, wherein the authenticating and transacting module is further for determining whether the server receives the fourth authenticating password in predetermined time, if yes, determining whether the fourth authentication password and the second authentication password are identical; otherwise sending information indicating overtime for inputting password to the client.

14. The system of claim 11, wherein the second receiving module of the server is further for receiving the static code input by the user;

accordingly, the authenticating and transacting module of the client is further for determining whether the static password is correct, and further for determining whether the fourth authentication password and the second authentication password are identical, the authenticating and transacting module is further for confirming that the user is not legitimate if the authenticating and transacting module determines that the fourth authentication password and the second authentication password are not identical.

15. The system of claim 10, wherein the dynamic factor is a random number or times of generating dynamic passwords by the dynamic password token.

16. The system of claim 15, wherein if the dynamic factor is a random number, the first value is the random number; and if the dynamic factor is the times of generating dynamic passwords by the dynamic password token, the first value is got by the dynamic password token according to the times of generating dynamic passwords.

17. The system of claim 10, wherein the second generating module of the server specifically comprises a number searching unit for searching the dynamic password token number bonded with the user account according to the user account received from the transaction data; and a seed searching unit for searching the seed of the dynamic password token according to the dynamic password token number.

18. The system of claim 15, wherein the second generating module of the server specifically comprises a dynamic password generating unit for the server to generate the first dynamic password by taking the received first value as the dynamic factor and using the first value and the found seed of the dynamic password token according to dynamic password generating algorithm, if the dynamic factor is a random number; and if the dynamic factor is the times of generating dynamic passwords by the dynamic password token, the dynamic password generating unit is used further for correcting the times of generating dynamic passwords stored at the server according to the first value, and generating the first dynamic password by using corrected times of generating dynamic password and the founded seed according to the dynamic generating algorithm.

* * * * *